June 23, 1936.  R. B. WHITFIELD  2,045,211
COMBINED COFFEE ROASTER AND GRINDER
Filed Jan. 30, 1934
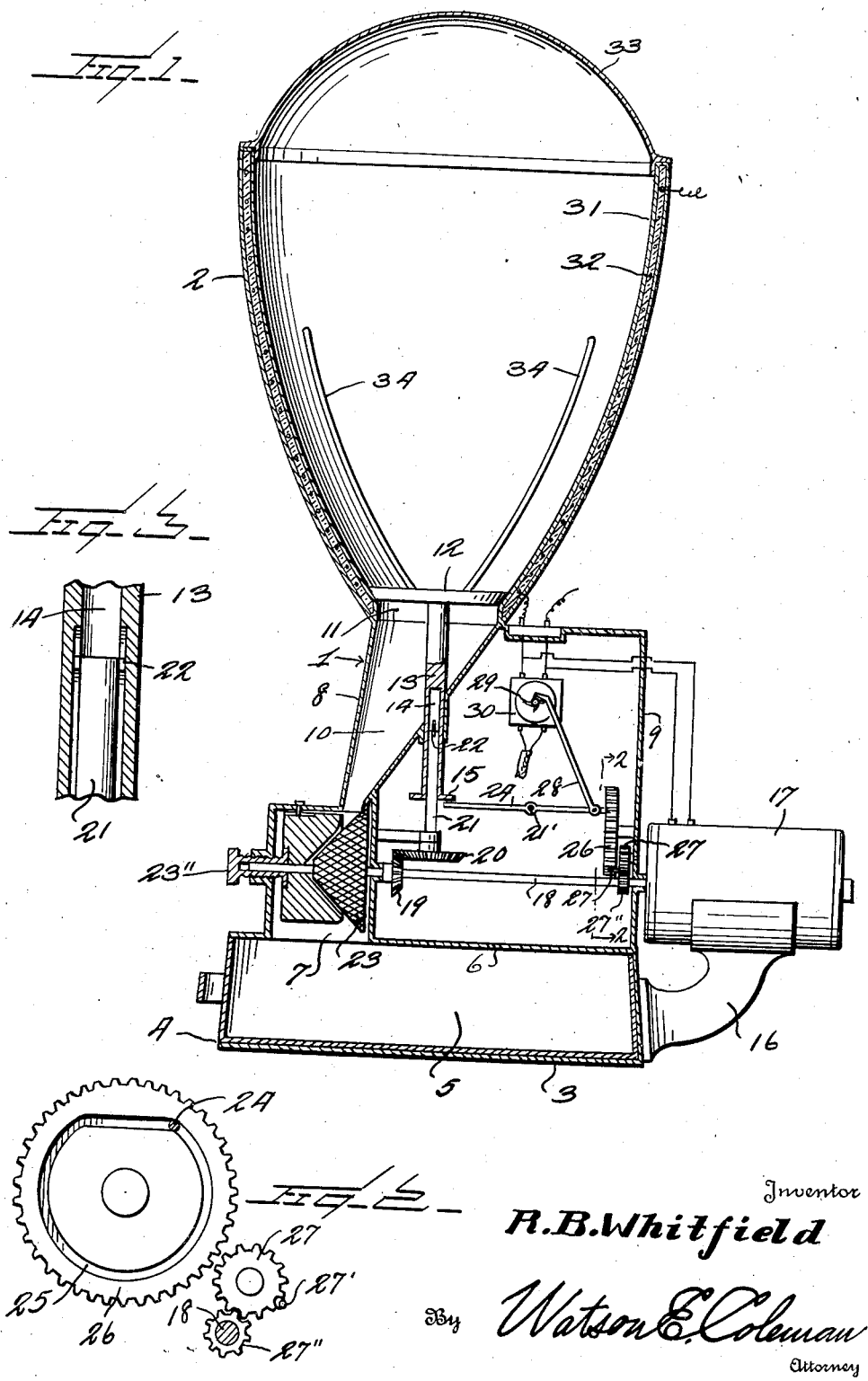
Inventor
R.B.Whitfield
By Watson E. Coleman
Attorney Patented June 23, 1936

2,045,211

UNITED STATES PATENT OFFICE 2,045,211

COMBINED COFFEE ROASTER AND GRINDER

Richard B. Whitfield, Riverside, Calif.

Application January 30, 1934, Serial No. 709,049

6 Claims. (Cl. 83—18)

This invention relates to a class of coffee roasting and grinding and pertains particularly to a combined roaster and grinder designed for domestic use.

The primary object of the present invention is to provide a combination coffee roaster and grinder of a character to be used in the home whereby green coffee may be purchased and a small or predetermined quantity roasted and ground as required.

A further object of the invention is to provide in a device of the above described character, a novel means of roasting a predetermined quantity of coffee automatically or in other words a novel means of producing the required quantity of coffee for a brewing, without attending to or watching the process further than to start to operating the apparatus by which this is accomplished.

A still further object of the invention is to provide a combined coffee roaster and grinder for domestic use whereby a quantity of coffee after being placed in the apparatus and the latter started to operating, will be roasted and then automatically discharged from the roaster into a grinder from which it will then pass into a receiving receptacle in the proper condition for use.

Other objects and advantages of this invention will in part be described in, and in part be understood from the following detail description of the present preferred embodiment, the same being illustrated in the accompanying drawing wherein:—

Figure 1 is a vertical sectional view through the machine embodying the present invention.

Figure 2 is a section view taken on the line 3—3 of Figure 1.

Figure 3 is a view in vertical section of the shiftable valve stem showing the connection of the operating shaft therewith.

Referring now more particularly to the drawing wherein like numerals of reference designate corresponding parts throughout the several views, the numeral 1 indicates generally the lower or basal portion of the device embodying the present invention, upon the upper part of which is mounted a bowl 2. The base portion comprises a lower housing 3 having a door opening through one wall, as indicated at 4, through which a drawer or bin 5 may be introduced.

Within the housing 3, above the bin or drawer 5 is a wall 6 through which is formed a discharge opening 7 for the passage downwardly of ground coffee from the grinding apparatus disposed thereabove and hereinafter more particularly referred to. The upper part of the base 1 tapers upwardly forming roughly a cone 8, a portion of the wall of which is built out, as indicated at 9, for the purpose hereinafter described. Extending upwardly through the cone portion 8 of the base from the opening 7 is a chute 10, the upper end of which opens through the constricted top end of the cone like portion of the base which forms an inlet opening, indicated by the numeral 11, through which roasted coffee passes downwardly after the roasting operation is complete as will also hereinafter be described. The edge of this opening 11 constitutes a seat for a disc valve 12 which has a tubular stem 13 which passes downwardly through a suitable guide sleeve which is carried by and extends upwardly from the chute 10, into the interior of the cone like housing 8. This tubular stem 13 is provided with the longitudinal slot 14 in the wall thereof and at its lower edge a lateral flange 15 is formed.

Mounted upon a suitable support or bracket such as that indicated by the numeral 16, exteriorly of the base, is an electric motor 17 having a shaft 18 which passes through the lower portion of the housing 8 and through the lower end of the chute 10. On this shaft is a gear 19 which meshes with a gear 20 carried upon the lower end of the vertical shaft 21 which extends upwardly into the tubular stem 13 of the valve 12. This shaft 21 carries a lug or burr 22 which has slidable engagement in the slot 14.

The shaft 18 of the motor connects with a suitable grinding mechanism 23 in the lower part of the coffee chute 10 so that coffee passing downwardly through the chute will be ground as desired before it is discharged through the opening 7 into the receptacle or drawer 5. As any suitable grinding mechanism may be employed for operation by the shaft 18, so any suitable means may be devised for controlling the grinding mechanism so that the degree of fineness of the ground coffee may be regulated. This means for regulating the grinding action of the grinding mechanism is illustrated and indicated by the numeral 23''.

Mounted intermediate its ends upon a suitabe horizontal pivot 21', within the portion 8 of the base, is a lever rod or bar 24, one end of which positions beneath and engages the lateral extension 15 of the tubular stem 13. The other end of this bar 24 engages in a cam groove 25 formed in one face of a ratchet wheel 26 which is rotatably mounted in the base. Mounted in the base adjacent the ratchet wheel 26 is a gear 27 which carries a pawl finger 27' and which meshes with a small gear 27'' which is mounted upon the shaft 18 of the motor. This pawl 27' is arranged to engage between a pair of the ratchet teeth of the wheel 26 to impart rotary movement thereto, each time the small gear 27 makes a revolution. By this means a step by step slow rotary motion is imparted from the motor shaft 18 to the wheel 26.

As illustrated, the major portion of the cam groove 25 is concentric with the gear 26 while a small section thereof is offset toward the center of the gear so that when the inserted end of the rod 24 passes into this offset that end of the rod will be caused to move inwardly toward the center of the gear, thus raising the opposite end and lifting the valve 12 from its seat.

Coupled with the outer end of the rod 24, which is that end which engages in the cam groove 25 is a pawl 28 which has its other end in contact with a ratchet 29 which is coupled with an electric switch 30. By means of this pawl 28 the switch 30 is operated each time the outer end of the rod 24 is raised after it has been depressed by passing into the offset portion of the cam groove 25.

The ratchet 29 is fixed to the stem of the switch by means of which the rotary inner parts of the switch are actuated and which carries, in the usual manner, a button by which the switch may be manually actuated. This stem of the switch may be extended to the exterior of the housing 8 to receive the said actuating button so that the parts of the switch may be manually turned as well as turned by the pawl 28.

The bowl 2 has within it an inner bowl 31 of metal or other suitable material and disposed between these bowls 2 and 31 is a bowl 32 formed of a suitable insulation substance in which is imbedded an electric resistance element by means of which the contents of the inner bowl are heated. The inner bowl is joined with the top edge of the opening 11 so that no breaks occur in the inner surface formation of the structure in which dust or other substance may lodge. The top of the bowl 2 has the cover or lid 33 thereon which protects the contents.

The valve 12 has secured to its top surface agitating arms 34 which extend upwardly within the coffee receptacle and are rotated with the valve while the coffee is being roasted.

Any suitable wiring may be employed for operating the motor and the resistance coil in the middle bowl unit 32. Within the housing 8 a thermostat may be located to control the circuit leading to the heating element in the heating bowl 32 to maintain the proper temperature to roast the coffee with the required speed.

From the foregoing it is believed that the operation of the present device will be clear. However, a short description of the same will be given. In operation, the required amount of coffee to be roasted and ground is placed in the inner bowl 31, the cover or lid 33 put on and the switch for the device turned on. This will start the motor 17 operating and will also energize the heating coil in the middle bowl 32, starting the roasting operation. At the same time the vertical shaft 21 will start rotating, turning the valve 12 and the arms 34 so as to constantly stir the coffee beans. At the start of this operation the outer end of the rod 24 will be at one side of the offset portion of the cam groove 25 and the gear 26 will turn in the direction to cause the end of the rod to move throughout the entire extent of that portion of the cam groove which is concentric with the gear, thus giving sufficient time for the coffee to be thoroughly roasted.

Upon reaching the opposite side of the offset portion of the groove the outer end of the rod 24 will be shifted inwardly or downwardly thus causing the opposite end to be raised and effecting the lifting of the valve 12 so as to uncover the opening 11 leading to the passage or chute 10 and allow the coffee beans to pass into the chute 10 toward the grinding element 23. As the outer end of the rod 24 reaches the opposite side of the offset portion of the cam groove it will again be raised and this lowering and raising of the outer end of the rod lowers and raises the pawl 28 and effects, through the return movement of the pawl, the turning of the switch 30 which shuts off the current flow to the motor and the heating element. The extent of the offset portion of the groove 25 is such, however, that sufficient time is allowed before the current is shut off for the grinding mechanism to grind all of the coffee and this will be discharged through the opening 7 into the receptacle or drawer 5, ready for use.

What is claimed is:—

1. A combined coffee roaster and grinder, comprising a bowl, an electric means for heating the contents of the bowl, said bowl having a discharge outlet, a vertically shiftable disc valve closing said discharge outlet, a grinder disposed beneath the outlet, a chute leading from the discharge outlet to the grinder, means for operating said grinder, agitating arms carried by said valve disc and extending into the bowl, means connected with the grinder operating means for rotating the valve disc, time controlled means for opening said valve after a predetermined period of operation of the grinder operating means, and means forming a part of the mechanism operating at a predetermined time after the opening of the valve to stop the operation of the grinder operating means.

2. A combined coffee grinder and roaster comprising an electrically heated roasting bowl having a discharge opening, a grinder, a chute leading from the discharge opening to the grinder, an electric motor operating the grinder, a valve controlling said discharge opening, said valve when open being raised from a seat, an oscillatably mounted arm which when oscillated in one direction raises said valve, a rotatable body having a cam groove in which an end of said arm is engaged, said cam groove having an offset portion which effects the oscillation of the arm for the opening of the valve, and connecting means between the motor and the rotatable body for effecting the rotation of the latter.

3. A combined coffee grinder and roaster comprising an electrically heated roasting bowl having a discharge opening, a grinder, a chute leading from the discharge opening to the grinder, an electric motor operating the grinder, a valve controlling said discharge opening, said valve when open being raised from a seat, an oscillatably mounted arm which when oscillated in one direction raises said valve, a rotatable body having a cam groove in which an end of said arm is engaged, said cam groove having an offset portion which effects the oscillation of the arm for the opening of the valve, connecting means between the motor and the rotatable body for effecting the rotation of the latter, a switch controlling the flow of current to said motor and the electric heating means for said bowl, and means actuated by a moving part of the structure to open said switch at a predetermined period after the opening of said valve.

4. A combined coffee grinder and roaster comprising an electrically heated roasting bowl having a discharge opening, a grinder, a chute leading from the discharge opening to the grinder, an electric motor operating the grinder, a valve controlling said discharge opening, said valve when open being raised from a seat, an oscillatably mounted arm which when oscillated in one direction raises said valve, a rotatable body having a cam groove in which an end of said arm is engaged, said cam groove having an offset portion which effects the oscillation of the arm for the opening of the valve, connecting means between the motor and the rotatable body for effecting the rotation of the latter, a switch controlling the flow of current to said motor and to the bowl heating means, said switch being of the type having a rotatable operating element, a ratchet wheel connected with said operating element, and a pawl connected with and operated by said arm and shifted by the arm at a period after the opening of said valve to open said switch.

5. A combined coffee roaster and grinder, comprising a bowl having inner and outer walls, an electric heating element disposed between said walls, said bowl having a bottom discharge opening, a housing supporting said bowl, a receptacle removably disposed in the bottom of the housing, a coffee grinder in the housing over the receptacle and discharging thereinto, a chute leading from the receptacle outlet to the coffee grinder, a vertically shiftable disc valve closing said outlet and having a tubular stem extending downwardly into the housing, agitating arms carried by the valve disc and extending into the bowl, an electric operating motor for the grinder having a shaft connected with the grinder, a shaft driven by the motor shaft and extending into and slidably connected with the tubular valve stem, a rotatably mounted wheel having a cam groove in a face thereof, an oscillatably mounted arm having an end in said groove and having its other end engaging said stem, connecting means between said wheel and said motor shaft, said cam groove effecting the opening and closing of said valve through the medium of said arm, after a predetermined period of operation of the motor and heating element, a switch controlling the flow of current to the motor and heating element, and means connected with and operated by the valve actuating arm and connecting with said switch to open the latter and shut off the current to the motor and heating element when the valve is closed.

6. In a device of the character described, a bowl having a bottom outlet, means for heating said bowl to effect the roasting of coffee therein, a coffee grinding mechanism disposed beneath said outlet and comprising a fixed and a rotatable grinding element, a chute leading from said outlet to said grinders and having a sleeve opening through a wall on the axial center of said bowl opening, a shaft coupled with said rotary element of the grinder, means coupled with said shaft for rotating the same, a shaft rotatably mounted adjacent to and having gear connection with said first shaft, said second shaft being directed into said sleeve, a valve closing said bowl opening and having a tubular stem slidably receiving the second mentioned shaft and coupled therewith against rotary movement relative thereto, said stem extending through said sleeve, agitator fingers carried by the valve and disposed within the bowl, and means operated by said motor for lifting said valve and stem after a predetermined period of operation of the device.

RICHARD B. WHITFIELD.